(12) United States Patent
Jungnitz et al.

(10) Patent No.: US 7,396,401 B2
(45) Date of Patent: Jul. 8, 2008

(54) EFFECT PIGMENTS OF UNIFORM SHAPE AND SIZE

(75) Inventors: Michael Jungnitz, Langen (DE); Gerald Fuchs-Pohl, Weiterstadt (DE); Reinhold Rueger, Rödermark (DE)

(73) Assignee: Merck Patent GmbH, Darmstadt (DE)

( * ) Notice: Subject to any disclaimer, the term of this patent is extended or adjusted under 35 U.S.C. 154(b) by 316 days.

(21) Appl. No.: 10/894,238

(22) Filed: Jul. 20, 2004

(65) Prior Publication Data

US 2005/0019575 A1 Jan. 27, 2005

(30) Foreign Application Priority Data

Jul. 21, 2003 (DE) .............. 103 33 027

(51) Int. Cl.
*C09C 1/00* (2006.01)
*B32B 5/16* (2006.01)
*B32B 9/00* (2006.01)
*B32B 15/02* (2006.01)
*B32B 17/02* (2006.01)
*B05D 3/02* (2006.01)
*B05D 1/36* (2006.01)
*B05D 7/00* (2006.01)

(52) U.S. Cl. .................................... 106/415
(58) Field of Classification Search ................ 106/415; 428/403, 404, 407; 427/372.2, 402
See application file for complete search history.

(56) References Cited

U.S. PATENT DOCUMENTS

| | | | |
|---|---|---|---|
| 3,608,835 A * | 9/1971 | Ruzicka ............... | 241/4 |
| 3,639,147 A * | 2/1972 | Benefiel et al. ............ | 428/216 |
| 4,321,087 A * | 3/1982 | Levine et al. .............. | 75/356 |
| 4,675,251 A * | 6/1987 | Matijevic et al. ........... | 428/404 |
| 4,775,520 A * | 10/1988 | Unger et al. ............... | 423/335 |
| 4,801,445 A * | 1/1989 | Fukui et al. ............... | 424/69 |
| 4,976,777 A * | 12/1990 | Ozawa et al. .............. | 75/255 |
| RE34,145 E * | 12/1992 | Martin .................... | 523/205 |
| 5,354,374 A * | 10/1994 | Prengel .................... | 106/459 |
| 5,554,217 A * | 9/1996 | Babler .................... | 106/494 |
| 5,733,658 A * | 3/1998 | Schmid et al. ............. | 428/404 |
| 5,759,213 A * | 6/1998 | Adair et al. ............... | 23/305 A |
| 5,858,078 A * | 1/1999 | Andes et al. .............. | 106/437 |
| 6,150,022 A * | 11/2000 | Coulter et al. ............. | 428/403 |
| 6,428,773 B1 * | 8/2002 | Oko et al. ................. | 424/63 |
| 6,630,018 B2 * | 10/2003 | Bauer et al. .............. | 106/415 |
| 6,645,286 B2 * | 11/2003 | Ostertag et al. ........... | 106/460 |
| 6,822,782 B2 * | 11/2004 | Honeyman et al. .......... | 359/296 |
| 6,902,807 B1 | 6/2005 | Argoitia et al. | |
| 2003/0185972 A1 * | 10/2003 | Rieck et al. .............. | 427/140 |
| 2004/0151827 A1 * | 8/2004 | Argoitia et al. ............ | 427/7 |
| 2005/0024626 A1 * | 2/2005 | Faris ..................... | 356/71 |

FOREIGN PATENT DOCUMENTS

DE 102004032799 A1 * 2/2005
JP 2005-042112 * 2/2005

* cited by examiner

*Primary Examiner*—J. A. Lorengo
*Assistant Examiner*—Patricia L Hailey
(74) *Attorney, Agent, or Firm*—Millen, White, Zelano, Branigan, P.C.

(57) ABSTRACT

Effect pigments based on a flake-form substrate that have a circular or elliptical shape or have the shape of a polygon, the preparation thereof, and the use thereof, for example, in paints or coatings, or as tracers.

22 Claims, No Drawings

EFFECT PIGMENTS OF UNIFORM SHAPE AND SIZE

The present invention relates to effect pigments of uniform shape and size based on a flake-form substrate of circular or elliptical shape or in the shape of a polygon, to the preparation thereof and to the use thereof, for example in paints, coatings or as tracers.

Effect pigments based on substrates are employed in a number of applications, such as, for example, in paints, coatings or in cosmetics. The substrate employed is usually natural mica, which may be coated with one or more metal oxide, metal or metal fluoride layers. These pigments are disclosed in a number of applications, such as, for example, WO 93/12182, WO 98/53011, WO 98/38254, EP 0 753 545 or DE 100 61 178.

The use of natural mica is associated with a number of disadvantages. Thus, the surface of mica does not have ideal smoothness, but instead has irregularities, such as, for example, steps, which limit the quality of the resultant effect pigments. Furthermore, foreign-ion impurities present in the mica can modify the colour impression of the effect pigments.

In order to circumvent these problems, WO 93/08237 has proposed preparing transparent, inorganic, flake-form matrices from, for example, silicon dioxide or aluminium oxide, which may contain an additional constituent, by means of a belt process. The additional constituent employed can be a soluble or insoluble colorant, such as, for example, carbon black or organic pigments. Control of the amount of additional constituent enables the hiding power of the otherwise transparent matrix materials to be varied. High concentrations of additional constituents accordingly result in a greater hiding power. The substrates prepared by means of this belt process are detached from the belt and ground. Just as in the case of natural mica, this grinding process results, in the case of the pigments described in WO 93/08237, in the formation of grain fractions comprising particles of different size and shape, increasing the scattering. The different grain fractions have to be separated from one another in a complex manner by sieving, sedimentation or decantation. This only succeeds to a certain extent, i.e. individual grain fractions of a certain size are instead in the form of a distribution around the desired size. This has a disadvantageous effect both on the optical properties and on the processing properties, as described in greater detail below.

The size of the pigments has a not insignificant effect on the optical properties, such as hiding power and tinting strength, of effect pigments. Hiding power and tinting strength are coverage properties of the pigments in the applications. Tinting strength here is taken to mean a mass ratio in which a given reference pigment has to be replaced in the application system by the pigment to be investigated in order to achieve the same colour result of the application system. The hiding power is defined as the capacity of a pigmented material to hide the colour or colour differences of the substrate. The finer the particles of the effect pigments, the greater the hiding power, the larger the particles, the greater the tinting strength. Setting of the hiding power or tinting strength is thus always a compromise. It is not possible to control the tinting strength or hiding power in a targeted manner since the hiding power to tinting strength ratio is always prespecified via the particle-size distribution. Control of the hiding power in a targeted manner by complex separation into defined fine and coarse fractions automatically results in a high loss of material which can be employed. In the case of interference pigments, which exhibit two or more different colours (colour flop) depending on the viewing angle, the chroma of the colour flop, in addition to the tinting strength, is also determined by the size distribution of the pigments. The smaller the particle size, the lower the chroma of the colour flop, and the larger the particles, the more pronounced is the chroma of the colour flop. In addition, a large variation latitude in the particle-size distribution also has a disadvantageous effect on the lustre. Small or irregularly shaped particles cause increased light scattering at these particles, which reduces the lustre.

Besides these adverse effects of particle distributions of non-uniform size on the optical properties, the pigments from the prior art also have disadvantages with respect to their processing properties. The presence of different pigment sizes within a pigment fraction can result in blocking of, for example, filters, sieves or nozzles, for example in automatic spraying equipment, by excessively large particles. In addition, relatively small particles can agglomerate and likewise contribute to filter blockage. This can result in expensive and complex maintenance work at paint manufacturers, which is undesired in the production process.

In electrophotographic printing processes in particular, very high requirements are made of the particle size and particle-size distribution of the toners used therein. For use in such toners, effect pigments from the prior art have to be classified in a complex manner, for example by air classification. The process has considerable economic disadvantages, since a complex working step is necessary and a considerable part of the crude product is lost in the process.

There was therefore a demand for effect pigments which do not have the above-mentioned applicational disadvantages and difficulties in setting hiding power and/or tinting strength.

The invention in one aspect had the objects of providing flake-form effect pigments based on substrates which have either high hiding power or intense tinting strength, high lustre and optionally a colour change as the viewing angle is varied, and which can be prepared by means of a simple process, to a process for the preparation thereof and to the use thereof.

These objects according to the invention are achieved by effect pigments of uniform shape and size based on a flake-form inorganic substrate, characterised in that the substrate has a circular or elliptical shape or is a polygon $V_n$, where n=the number of corners and $n \geq 3$.

The term "uniform shape and size" means, that the size of the effect pigments according to the present invention does not differ significantly. The degree of deviation depends on the size of the effect pigments, generally the deviation should be not more than 50%, preferably not more than 25% and most preferably not more than 15%, based on the diameter of the pigment. In contrast, pigments known from the state of the art usually show for one selected size deviations up to 500%, based on the diameter. Ideally, each particle of a produced batch should have identical size, but with respect to variations of the structured support used during the preparation of the pigments, the above-mentioned deviations concerning the size of the pigments are possible.

The object is furthermore achieved by a process for the preparation of the effect pigments according to the invention comprising the process steps of:

a) application of a film comprising a substrate precursor to a structured support having structuring in circular or elliptical shapes or in the shape of a polygon $V_n$, b) solidification of the film by drying, c) development of a substrate by chemical reaction from the substrate precursor, d) removal of the substrate from the structured support and e) optionally washing, drying and/or calcination of the substrate.

These objects of the invention are furthermore achieved by the use of the above-described effect pigments based on a flake-form inorganic substrate, where the substrate has a circular or elliptical shape or is a polygon $V_n$, in paints, coatings, printing inks, toners, plastics, cosmetic formulations, in the foods sector, in pharmaceutical products, ceramic materials, glasses, paper, for laser marking, in security materials, in dry preparations, in pigment preparations or as tracers.

The present invention also relates to paints, coatings, printing inks, toners, plastics, cosmetic formulations, foods, pharmaceutical products, ceramic materials, glasses, paper, security materials, dry preparations, pigment preparations or tracers comprising one or more effect pigments in accordance with this invention.

The effect pigments according to the invention have a uniform particle size and geometry which enable the tinting strength and hiding power of the pigment to be set individually. Due to the uniform size distribution of the pigments, the conventional complex classification processes, which only enable inadequate separation of the size fractions, are superfluous. The uniform particle size prevents the blocking of filters, screens and nozzles on use of the pigments according to the invention. In addition, the effect provides according to the invention exhibit improved lustre owing to the lack of light scattering at particles of different size. Furthermore, the pigments according to the invention can be prepared in a simple manner and can be used in a multiplicity of applications.

In accordance with the present invention, the effect pigments are based on flake-form inorganic substrates which have a circular or elliptical shape or the shape of a polygon $V_n$. They preferably have the shape of a polygon $V_n$, where n denotes the number of corners and n is $\geq 3$. n here represents an integer, where n is preferably 3, 4, 5, 6, 7 or 8. The polygons here may have a regular irregular shape. Very particular preference is given to n=4 (quadrangles) and n=6 (hexagon), where for the quadrangle all conceivable shapes, such as, for example, square, trapezium, rhombus, lozenge or rectangles with different edge lengths of the polygons, are included. In addition, however, combinations of a plurality of shapes and sizes are also conceivable, such as, for example, the combination of circles and lozenges.

The flake-form inorganic substrates can in principle consist of any metal oxide which can, in the form of a precursor, be applied to a structured support. They preferably consist of silicon oxide, aluminium oxide, boron oxide, titanium oxide, zirconium oxide and/or iron oxide. Aluminium oxide, silicon oxide and/or boron oxide are particularly preferred. Mixtures or one or more combinations of the above-mentioned materials can, for example, be in the form of a gradient over a single layer or in the form of discrete layers. The substrate can, for example, consist of a layer of silicon oxide and a layer of titanium oxide, but also of a layer in which titanium oxide and silicon oxide are in the form of a gradient or as a mixture.

The size of the effect pigments according to the invention is not crucial per se and is dependent on the particular area of application. The uniform size of the substrates and thus of the effect pigments is important for the advantageous properties of the pigments according to the invention.

Complex fractionations, which only allow incomplete isolation of individual particle-size ranges, are unnecessary. The loss of yield which occurs in these fractionations can likewise be avoided. The substrates generally have a thickness of between 0.05 and 5 µm, in particular between 0.1 and 4.5 µm. The circle diameter or the length of the ellipse main axis of the flake-form substrate having a circular or elliptical shape is from about 3 to 150 µm, preferably from 10 to 60 µm, and the greatest diameter of the polygon $V_n$ is from about 3 to 150 µm, preferably from 10 to 60 µm. In the case of substrates in the shape of polygons $V_n$, the greatest diameter is preferably from 5 to 45 µm in applications in the automobile sector and in industrial coatings, from 10 to 25 µm in the printing sector and preferably from 50 to 150 µm in cosmetics.

In a further embodiment of the present invention, the effect pigment according to the invention can be coated with one or more layers comprising metal oxides, metal oxide hydrates, metal suboxides, metals, metal fluorides, metal nitrides, metal oxynitrides or mixtures of these materials. The coating here can cover the entire substrate, or alternatively may only be present on part of the substrate, for example only on individual sides of the substrate. The metal oxide, metal oxide hydrate, metal suboxide, metal, metal fluoride, metal nitride or metal oxynitride layers or the mixtures thereof can be of low refractive index (refractive index<1.8) or high refractive index (refractive index$\geq$1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, titanium suboxides. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly metal oxide and/or metal oxide hydrate layers are preferably applied to the substrate. Besides the positive properties according to the invention, such as, for example, controllable hiding power and tinting strength for improved applicational properties, effect pigments having this structure exhibit a number of different colours, which can be set through the choice of the layer material and the layer thicknesses.

Furthermore, multilayered structures comprising high- and low-refractive-index metal oxide, metal oxide hydrate, metal or metal fluoride layers may also be present, preferably with high- and low-refractive-index layers alternating. Particular preference is given to layer packages comprising a high-refractive-index layer and a low-refractive-index layer, it being possible for one or more of these layer packages to be applied to the substrate. The sequence of the high- and low-refractive-index layers can be matched to the substrate here in order to include the substrate in the multilayered structure.

The high-refractive-index layers employed are preferably high-refractive-index metal oxide layers, very particular preference being given, for example, to $TiO_2$, titanium suboxides, $Fe_2O_3$, $SnO_2$, $ZnO$, $ZrO_2$, $Ce_2O_3$, $CoO$, $Co_3O_4$, $Cr_2O_3$ and/or mixtures thereof. The low-refractive-index layers employed are preferably low-refractive-index metal oxide, metal fluoride and/or metal oxide hydrate layers, particular preference being given to aluminium oxide, aluminium oxide hydrate, silicon oxide, silicon oxide hydrate and/or magnesium fluoride.

In a further embodiment, the metal oxide, the metal oxide hydrate, metal suboxide, metal, metal fluoride, metal nitride and metal oxynitride layers may be mixed or doped with colorants or other elements. Suitable colorants or other elements are, for example, organic or inorganic coloured pigments, such as coloured metal oxides, for example magnetite, chromium oxide or coloured pigments, such as, for example, Berlin Blue, ultramarine, bismuth vanadate, Thenard's Blue, or alternatively organic coloured pigments, such as, for example, indigo, azo pigments, phthalocyanines or alternatively Carmine Red or elements, such as, for example, yttrium or antimony. In a preferred embodiment, the outer layer on the substrate is a high-refractive-index metal oxide. This outer layer may additionally be on the above-mentioned layer packages or may be part of a layer package in high-refractive-index substrates and can, for example, consist of $TiO_2$, titanium suboxides, $Fe_2O_3$, $SnO_2$, ZnO, $ZrO_2$, $Ce_2O_3$, CoO, $Co_3O_4$, $Cr_2O_3$ and/or mixtures thereof, such as, for example, ilmenite or pseudobrookite. $TiO_2$ is particularly preferred.

Examples and embodiments of the above-mentioned materials and pigment structures are also given, for example, in Research Disclosure RD 471001, the disclosure content of which is incorporated herein by way of reference.

Effect pigments comprising these layers exhibit a wide variety of colours with respect to their mass tone and can in many cases exhibit an angle-dependent change in the colour (colour flop) due to interference. In addition, these effect pigments according to the invention have, owing to their uniform size and shape, improved lustre and a stronger colour flop than those from the prior art.

The thickness of the metal oxide, metal oxide hydrate, metal suboxide, metal, metal fluoride, metal nitride or metal oxynitride layers or a mixture thereof is usually from 3 to 300 nm, and in the case of the metal oxide, metal oxide hydrate, metal suboxide, metal fluoride, metal nitride or metal oxynitride layers or a mixture thereof is preferably from 20 to 200 nm. The thickness of the metal layers is preferably from 4 to 50 nm.

The effect pigments according to the invention may furthermore be provided with an additional organic coating as outer layer. Examples of coatings of this type are found, for example, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805, the disclosure content of which is incorporated herein by way of reference. Besides the improved optical properties already mentioned, effect pigments comprising this organic coating, for example comprising organosiloxanes or organotitanates or organozirconates, additionally exhibit increased stability to weathering influences, such as, for example, moisture and light, which is of particular interest especially for industrial coatings and in the automobile sector.

The effect pigments according to the invention are obtainable by
 a) application of a film comprising a substrate precursor to a structured support having structuring in circular or elliptical shapes or in the shape of a polygon $V_n$,
 b) solidification of the film by drying,
 c) development of a substrate by chemical reaction from the substrate precursor,
 d) removal of the substrate from the structured support and
 e) optionally washing, drying and/or calcination of the substrate.

In addition, the effect pigments according to the invention are obtainable by
 a) application of a film comprising a substrate precursor to a structured support having a structuring in circular or elliptical shape or in the shape of a polygon $V_n$,
 b) if necessary solidification of the film by drying,
 c) repetition of steps a) and b) one or more times, in each consecutive case using different substrate precursors,
 d) solidification of the film by drying,
 e) development of a substrate by chemical reaction from the substrate precursor,
 f) separation of the substrate from the structured support and
 g) optionally washing, drying and/or calcination of the substrate.

Effect pigments obtainable in this way comprise substrates which consist, for example, of mixtures of different substrate materials, it being possible for the mixture to be, for example, in the form of a gradient or in the form of discrete layers.

The present invention furthermore relates to a process for the preparation of the effect pigments according to the invention comprising the process steps of:
 a) application of a film comprising a substrate precursor to a structured support having structuring in circular or elliptical shapes or in the shape of a polygon $V_n$,
 b) solidification of the film by drying,
 c) development of a substrate by chemical reaction from the substrate precursor,
 d) removal of the substrate from the structured support and
 e) optionally washing, drying and/or calcination of the substrate.

The structured support in the present invention can consist of all common materials, such as, for example, metals, plastics or other materials. The support preferably consists of plastic, such as, for example, polyethylene terephthalate, polyester or polyacrylates, and is in the form of a continuous belt which has the structuring. Polyethylene terephthalate is preferably used as belt material.

Analogous belt processes using unstructured belts are disclosed in the prior art and are described, for example, in WO 93/08237 and references cited therein, which are incorporated in this application by way of reference. WO 97/27251 discloses a process for the preparation of polymeric organic pigment particles in which a polymerisable mixture of, for example, polyesters, polyurethanes or silicones is applied to a surface provided with recesses in the shape of the desired pigment particles, the mixture is brought to polymerisation, and the particles are removed from the recesses. The surface provided with recesses here can consist of a film, a rotatable roll or a roller belt. However, the polymerisation only takes place using polymerisation initiators or through irradiation, which requires increased equipment complexity for carrying out the process.

By contrast, the development of the substrate in the present invention takes place through chemical reaction directly after the solidification of the film by drying without further addition of initiators and without irradiation with light.

The structuring of the support is designed in such a way that it has in circular or elliptical shape a circle diameter or ellipse main axis with a length of from 3 to 150 µm and in the shape of the polygon $V_n$ a greatest diameter of from 3 to 150 µm. The structuring can, for example, be in the form of a groove or grid structure, where the grid structure can consist of regularly arranged, parallel or crossed grooves, lines, hemispheres, spheres, pyramids, cubes or correspondingly shaped holes. The structuring here is preferably designed in such a way that squares, trapeziums, rhombi, lozenges, rectangles or hexagons are present. These shapes in particular can be arranged flush against one another without problems without the occurrence of interspaces, which, as waste, cannot be utilised. In addition, however, combinations of a plurality of shapes and sizes are also conceivable.

Substrate precursors which can be used are solutions or suspensions comprising one or more inorganic or organic compounds of the elements silicon, aluminium, boron, titanium, zirconium and/or iron. Inorganic compounds which can be employed are the corresponding salts, such as, for example, halides, nitrates, sulfates, phosphates, oxides or oxide hydrates, but also borates, aluminates and/or silicates. Organic compounds can, for example, be alkoxy compounds of the respective elements. The substrate precursor preferably comprises inorganic compounds of the elements silicon and/or aluminium and in particular silicates, very particular preference being given to water-glass.

Furthermore, the substrate precursor can comprise network formers, preferably in the form of soluble salts, such as, for example, aluminates and/or borates, which have an advantageous effect on the formation and stability of the substrates. Preferred network formers are sodium aluminate and/or sodium borate. The proportions of the network formers are 0.1-30% by weight, preferably 1-20% by weight, based on the substrate.

Suitable wetting agents for improving the wetting of the structured support with the substrate precursor are all wetting agents known to the person skilled in the art, it being possible for these to be ionic or nonionic. Neither the type nor the amount of added wetting agent is crucial, but in general the proportion of wetting agent is a maximum of up to 2% by weight, based on the substrate precursor.

A film comprising the substrate precursor is applied to the structured support, it being possible for the substrate thickness later obtained to be varied through the amount of applied substrate precursor. The film can be applied by the belt process described above, but can also be applied by alternative methods, such as, for example, the dip-casting process. The film obtained is preferably sufficiently thick that the structured support is covered completely and continuously with the film. In this preferred form, the film has a copy of the structuring in the direction of the structured support and a smooth surface on the side opposite to the structuring.

The chemical reaction initiated by drying results in the development of a solid substrate with a structuring in uniform size and shape. The chemical reaction is preferably a hydrolysis or condensation reaction which results in crosslinking of the substrate precursor.

The separation, washing, drying and/or calcination (steps d)-e)) of the process according to the invention are carried out by methods familiar to the person skilled in the art, as also described, for example, in WO 93/08327, and can be matched to the particular system in a manner known to the person skilled in the art. The substrate is preferably separated off by means of a liquid or gas jet. In this process step, comminution of the substrate may already occur. In the process according to the invention, the comminution preferably takes place at fracture edges arising due to the structuring. For the purposes of this application, the latter are the edges which project into the substrate film owing to the structuring. At these edges, the substrate is thinner than elsewhere in the substrate film. The structuring of the support thus also introduces nominal breaking points into the substrate. External action, such as, for example, a liquid jet, during separation of the substrate results in fracture at the nominal breaking points, and substrate particles of uniform shape and size are obtained.

In a particular embodiment of the process according to the invention, the following process steps are carried out:
a) application of a film comprising a substrate precursor to a structured support having a structuring in circular or elliptical form or in the form of a polygon $V_n$,
b) if desired solidification of the film by drying,
c) repetition of steps a) and b) one or more times, using different substrate precursors in each consecutive case,
d) solidification of the film by drying,
e) development of a substrate by chemical reaction from the substrate precursor,
f) separation of the substrate from the structured support and
g) optionally washing, drying and/or calcination of the substrate.

In this particular embodiment, steps a) and b) are repeated one or more times in step c). This enables the production of substrates from different substrate precursors, for example firstly through the use of water-glass and furthermore through the use of alkoxysilanes. Alternatively, effect pigments based on substrates comprising material mixtures can be prepared, for example silicon/aluminium, silicon/boron and aluminium/boron mixtures. The mixture here can be in the form of a gradient or in the form of discrete layers. In the latter case, the performance of interim drying in step b) is preferred.

In a further embodiment of the process according to the invention, the substrate can be coated with one or more layers comprising metal oxides, metal oxide hydrates, metal suboxides, metals, metal fluorides, metal nitrides, metal oxynitrides or mixtures of these materials. Examples of materials of this type were described above under the structure of the pigments according to the invention. The coating can be carried out either wet-chemically, by means of a sol-gel process, or via CVD or PVD processes. The coating is preferably carried out wet-chemically or via CVD or PVD processes and very particularly wet-chemically. Examples of the said processes and the compounds and precursors which can be employed therein are given, for example, in EP 0 141 173, EP 0 332 071, DE 19 51 697, DE 23 13 332, DE 40 09 567, EP 0 645 851, EP 0 106 235 and EP 0 753 545. The coating may completely envelop the substrates or be applied only partially on one or more sides. If the substrate is, for example, separated from the support in accordance with the process according to the invention and then provided with a subsequent coating, enveloping of the substrate, preferably complete, with the layer material occurs, in particular in the case of wet-chemical coating. By contrast, the one or more layers can also be applied to the substrate located on the support, which is subsequently separated off from the support as a coated substrate. In this case, coating of the substrates only occurs on one side of the substrates, namely the side facing away from the support. Corresponding choice of the sequence of subsequent coating and separation from the substrate enables the optical effects which can be achieved to be matched further to the needs of the user. In particular, application of metal layers can result in particularly interesting optical effects in interaction with the substrate. The application of the one or more layers preferably takes place after separation of the substrate from the support.

The coating with one or more layers comprising metal oxides, metal oxide hydrates, metal suboxides, metals, metal fluorides, metal nitrides, metal oxynitrides or mixtures of these materials preferably takes place on the uncalcined substrate. The calcination is instead carried out after the coating steps for the entire effect pigment.

In addition, in a process which is likewise in accordance with the invention, an organic coating can additionally be applied as outer layer. Examples of coating processes of this type are given, inter alia, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 and EP 0 465 805. Examples of organic coatings and the associated advantages have already been described above under the structure of the pigments according to the invention. The process step of application of the organic coating can be carried out directly after the other steps of the process according to the invention.

Owing to their advantageous properties, the effect pigments according to the invention are used in paints, coatings, printing inks, toners, plastics, cosmetic formulations, in the foods sector, in pharmaceutical products, ceramic materials, glasses, paper, for laser marking, in security materials, in dry preparations, in pigment preparations or as tracers.

In the case of cosmetics, the pigments according to the invention are particularly suitable for products and formulations in decorative cosmetics, such as, for example, nail varnishes, colouring powders, lipsticks or eye-shadows, soaps, toothpastes etc. The pigments according to the invention can of course also be combined in the formulations with cosmetic raw materials and assistants of all types. These include, inter alia, oils, fats, waxes, film formers, preservatives and assistants which generally determine vocational properties, such as, for example, thickeners and rheological additives, such as, for example, bentonites, hectorites, silicon dioxide, Ca silicates, gelatin, high-molecular-weight carbohydrates and/or surface-active assistants, etc. The formulations comprising pigments according to the invention can belong to the lipophilic, hydrophilic or hydrophobic type. In heterogeneous formulations with discrete aqueous and nonaqueous phases, the pigments according to the invention may be present in each case only one of the two phases or alternatively distributed over both phases. Examples of the use of effect pigments in cosmetic formulations and materials which are suitable for this purpose are described in Research Disclosure RD 471001. The advantages of the uniform shape and size of the pigment particles according to the invention can be applied to the effect pigments described in RD 471001.

The pH values of the formulations can be between 1 and 14, preferably between 2 and 11 and particularly preferably between 5 and 8. The concentrations of the interference pigments according to the invention in the formulation are not subject to any limits. They can be—depending on the application—between 0.001 (rinse-off products, for example shower gels) and 100% (for example lustre-effect articles for particular applications. Pigments according to the invention may furthermore also be combined with cosmetic active ingredients. Suitable active ingredients are, for example, insect repellents, UV A/BC protection filters (for example OMC, B3 and MBC), anti-ageing active ingredients, vitamins and derivatives thereof (for example vitamin A, C, E, etc.), self-tanning agents (for example DHA, erythrulose, inter alia) and further cosmetic active ingredients, such as, for example, bisabolol, LPO, ectoine, emblica, allantoin, bioflavonoids and derivatives thereof.

On use of the pigments in paints and coatings, all areas of application known to the person skilled in the art are possible, such as, for example, powder coatings, automobile paints, printing inks for gravure, offset, screen or flexographic printing and paints in outdoor applications. For preparation of the printing inks, a multiplicity of binders, in particular water-soluble grades, is suitable, for example based on acrylates, methacrylates, polyesters, polyurethanes, nitrocellulose, ethylcellulose, polyamide, polyvinyl butyrate, phenolic resins, maleic resins, starch or polyvinyl alcohol. The paints can be water- or solvent-based paints, the choice of paint constituents being subject to the general knowledge of the person skilled in the art.

In addition, the pigments according to the invention can be used for the pigmenting of films and plastics, for example for agricultural sheeting, infra-red-reflective films and panes, gift foils, plastic containers and mouldings for all applications known to the person skilled in the art. Suitable plastics are all common plastics for the incorporation of the mouldings according to the invention, for example thermosets or thermoplastics. The description of the possible applications and plastics which can be employed, processing methods and additives are given, for example, in RD 472005 or in R. Glausch, M. Kieser, R. Maisch, G. Pfaff, J. Weitzel, Perlglanzpigmente, Curt R. Vincentz Verlag, 1996, 83 ff., the disclosure content of which is incorporated herein.

In addition, the pigments according to the invention are also suitable for use in security printing and in security-relevant features for, for example, counterfeiting-proof cards and identity papers, such as, for example, entry tickets, personal identity cards, banknotes, cheques and cheque cards, and for other counterfeiting-proof documents.

In the area of agriculture, the pigments can be used for colouring seed and other starting materials, in addition in the foods sector for pigmenting foods. The pigments according to the invention can likewise be employed for pigmenting coatings in medicaments, such as, for example, tablets or coated tablets, as described, for example, in DE 198 31 869 or U.S. Pat. No. 6,627,212.

In addition, the effect pigments according to the invention can also advantageously be mixed with all known organic and/or inorganic colorants, such as, for-example, organic dyes, organic, transparent and opaque white, coloured and black pigments and with flake-form iron oxides, organic pigments, holographic pigments, LCPs (liquid crystal polymers) and conventional transparent, coloured and black lustre pigments based on metal oxide-coated flakes based on mica, glass, $Al_2O_3$, $Fe_2O_3$, $SiO_2$, etc. The effect pigments according to the invention can be mixed in any ratio with commercially available pigments and fillers.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped, in accordance with requirements.

The pigments according to the invention are furthermore suitable for the production of flowable pigment preparations and dry preparations comprising one or more pigments according to the invention, binders and optionally one or more additives. The term dry preparations is also taken to mean preparations which comprise from 0 to 8% by weight, preferably from 2 to 8% by weight, in particular from 3 to 6% by weight, of water and/or a solvent or solvent mixture. The dry preparations are preferably in the form of pellets, granules, chips, sausages or briquettes and have particle sizes of 0.2-80 mm. The dry preparations are used, in particular, in the preparation of printing inks and in cosmetic formulations.

A particular possible application of the effect pigments according to the invention consists in their use as tracers in mixtures with further organic and/or inorganic colorants, for example for the marking of paints, coatings, printing inks, plastics, textiles, cosmetic formulations, foods, pharmaceutical products, ceramic materials, glasses, paper, security materials, dry preparations and pigment preparations.

Tracers are widely employed as identification means in modern products. With their aid, the aim is to demonstrate the authenticity of a product or to reconstruct the origin of a product. Common tracers are based on fluorescent, radioactive or luminescent substances, which are added to the product to be protected in the form of a powder, suspension or liquid. These substances are frequently toxicologically and environmentally dubious or require special apparatuses and equipment for detection.

The effect pigments according to the invention can be added to the colorants to be marked or products produced therefrom, such as, for example, paints, powders, coatings or suspensions, using all methods known to the person skilled in the art. The proportion of tracer in the product to be marked is usually ≦5% by weight, preferably <2% by weight and very particularly preferably 0.1-1% by weight, based on the marked product.

Depending on the size and/or geometry of the effect pigments according to the invention, the tracer can be detected very simply in the mixtures with pigments having a different shape by means of a microscope or using the scanning electron microscope. These tracers behave like other effect pigments in chemical and toxicological terms and are thus chemically inert and toxicologically acceptable. If the effect pigments according to the invention are mixed with other effect pigments, the colour properties of the tracer can be matched to those of the medium to be marked, which means an additional advantage since there is no fear of a change in the colour properties in the particular application. It is particularly advantageous to mix the pigments according to the invention with effect pigments which have the same layer structure, but not the same shape or the same size. Since the effect pigments according to the invention which are specifically matched to customer wishes for this application are not available, adequate copy protection of the mixture to be marked is ensured.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1

A polyethylene terephthalate film with a thickness of 100 μm on the surface of which a regular square structure having an edge length of 30 μm has been embossed (diameter of the polygon: 42.4 μm), is coated by the belt or dip casting method with a sodium water-glass solution (23% by weight of sodium orthosilicate) comprising 0.2% by weight of a commercially available wetting agent as wetting and flow agent. The sodium water-glass film is dried using air at 150° C. The dry film with a thickness of about 600 nm is detached from the substrate in the form of flakes of defined shape and size and subsequently irrigated at pH 5, during which the pH of the bath is kept constant using dilute hydrochloric acid. After the irrigation, the $SiO_2$ flakes are dried and then calcined at 800° C. Due to the square structure on the film, the fracture edges are predefined and the flakes fracture on detachment from the film and on calcination form square structures with an edge length of 30 μm.

Example 2

10 g of the square flakes from Example 1 are suspended in 250 ml of water, An $SnCl_4$ solution (preparation: 1.1 g of $SnCl_4*5 H_2O$ dissolved in 2 ml of conc. hydrochloric acid and 17 ml of water) is added dropwise at a metering rate of 0.1 ml/min with vigorous stirring at 75° C. and pH 1.8. The temperature is subsequently raised to 90° C., the pH is lowered to 1.5, and 20 ml of a $TiCl_4$ solution (content: 380 g of $TiCl_4$ per litre) are added dropwise. When the addition is complete, the resultant product is filtered off, washed and dried, giving a whitish powder which exhibits intense angle-dependent interference colours on spreading on a support.

Example 3

10 g of the flakes from Example 1 are suspended in 250 ml of water. The mixture is adjusted to 75° C. with vigorous stirring and adjusted to pH 2.3 using hydrochloric acid. An $FeCl_3$ solution (content: 6% by weight of Fe) is added dropwise at a metering rate of 0.1 ml/min. The pH is kept constant by addition of dilute sodium hydroxide solution. When the addition is complete, the resultant product is filtered off, washed and dried, giving a reddish powder which exhibits intense angle-dependent interference colours on spreading on a support.

Example 4

100 g of the flakes from Example 1 are heated to 180° C. under a stream of nitrogen in a fluidised-bed reactor. 25 g of chromium hexacarbonyl are warmed and introduced into the fluidised-bed reactor over a period of two hours by means of a carrier stream of argon. Under these conditions, the chromium hexacarbonyl decomposes with formation of thin metal layers on the flakes. The fluidised-bed reactor is cooled in a stream of argon, giving an opaque, silvery powder which exhibits intense angle-dependent interference colours on spreading on a support.

Example 5:

Pigments according to Example 2 are coated as described in EP 0 632 109. The resultant powder corresponds to the non-post-coated pigment in colour properties. The post-coated pigment is incorporated into a commercial waterborne surface-coating formulation. A finish produced therewith exhibits good condensation water resistance.

Example 6

Pigments according to Example 2 are admixed, in a proportion of 0.1% by weight, based on the total amount, with the Colorstream® Viola Fantasy ($SiO_2$ support coated with $SnO_2$ and $TiO_2$, Merck KGaA) pigment powder to be protected. In order to check the protected mixture, the powder is placed on a specimen slide and investigated by means of a microscope. The characteristic shape of the tracer is evident under the microscope. The addition of the tracer does not result in a change in the coloristic or applicational properties of the pigment powder to be protected.

The preceding examples can be repeated with similar success by substituting the generically or specifically described reactants and/or operating conditions of this invention for those used in the preceding examples.

The entire disclosures of all applications, patents and publications, cited herein and of corresponding German application No. 10333027.5, filed Jul. 21, 2003 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An effect pigment of uniform shape and size based on a flake-form, inorganic substrate, comprising inorganic flake-form substrates which are uniform in shape and size and have a circular or elliptical shape or a polygon $V_n$ shape, where
   n=the number of corners and
   n>3, wherein the flake-form inorganic substrate comprises one or more metal oxides, and on the substrate one or more layers comprising a metal oxide, metal oxide hydrates, metal suboxides, metal, metal fluorides, metal nitrides, metal oxynitrides or mixtures thereof.

2. The effect pigment according to claim 1, wherein n=3, 4, 5, 6, 7 or 8.

3. The effect pigments according to claim 1, wherein the one or more metal oxides of the substrate is silicon oxide, aluminium oxide, boron oxide, titanium oxide, zirconium oxide and/or iron oxide.

4. The effect pigment according to claim 1, wherein the flake-form substrate has a circular or elliptical shape with a circle diameter or an ellipse main axis of 3 to 150 µm, or has a polygon $V_n$ shape with a greatest diameter of 3 to 150 µm.

5. The effect pigments according to claim 1, wherein the thickness of the one or more layers is 3 to 300 nm.

6. The effect pigments according to claim 1, further comprising an organic outer layer.

7. The effect pigments according to claim 1, obtained by a process comprising
   a) applying a film comprising a substrate precursor to a structured support having structuring in circular or elliptical shapes or in the shape of a polygon $V_n$,
   b) solidifying the film by drying,
   c) developing a substrate by chemical reaction from the substrate precursor,
   d) removing the substrate from the structured support, and
   e) optionally washing, drying and/or calcining the substrate.

8. The effect pigment according to claim 7, wherein the substrate precursor comprises one or more inorganic or organic compounds comprising silicon, aluminium, boron, titanium, zirconium and/or iron.

9. The effect pigment according to claim 7, wherein the substrate precursor is a silicate.

10. The effect pigment according to claim 7, wherein the substrate precursor comprises a wetting agent and/or a network former.

11. The effect pigments according to claim 1, obtained by a process comprising
    a) applying a film comprising a substrate precursor to a structured support having a structuring in circular or elliptical shape or in the shape of a polygon $V_n$,
    b) optionally solidifying the film by drying,
    c) repeating a) and b) one or more times, in each consecutive case using a different substrate precursor,
    d) solidifying the film by drying,
    e) developing a substrate by chemical reaction from the substrate precursors,
    f) separating the substrate from the structured support, and
    g) optionally washing, drying anchor calcining the substrate.

12. A process for preparing effect pigments according to claim 1, comprising:
    a) applying a film comprising a substrate precursor to a structured support having a structuring in circular or elliptical shape or in the shape of a polygon $V_n$,
    b) optionally solidifying the film by drying,
    c) repeating steps a) and b) one or more times, in each consecutive case using a different substrate precursor,
    d) solidifying the film by drying,
    e) developing a substrate by chemical reaction from the substrate precursors,
    f) separating the substrate from the structured support, and
    g) optionally washing, drying and/or calcining the substrate.

13. A process for preparing effect pigments according to claim 1, comprising:
    a) applying a film comprising a substrate precursor to a structured support having structuring in circular or elliptical shapes or in the shape of a polygon $V_n$,
    b) solidifying the film by drying,
    c) developing a substrate by chemical reaction from the substrate precursor,
    d) removing the substrate from the structured support, and
    e) optionally washing, drying and/or calcining the substrate.

14. A process according to claim 13, wherein the support is a continuous belt.

15. A process according to claim 13, wherein the structuring has a circular or elliptical shape with a circle diameter or an ellipse main axis of 3 to 150 µm, or has a polygon $V_n$ shape with a greatest diameter of 3 to 150 µm.

16. A process according to claim 13, wherein the substrate precursor comprises one or more inorganic or organic compounds which are silicon, aluminium, boron, titanium, zirconium and/or iron.

17. A process according to claim 13, wherein the substrate precursor is a silicate.

18. A process according to claim 13, wherein the substrate precursor comprises a network former in the form of a soluble salt.

19. A process according to claim 13, further comprising coating the substrate with one or more layers comprising a metal oxide, metal oxide hydrate, metal suboxide, metal, metal fluoride, metal nitride, metal oxynitride or a mixture thereof.

20. A process according to claim 19, wherein the coating with one or more layers is carried out wet-chemically, by a sol-gel process or by CVD or PVD process.

21. A process according to claim 13, further comprising applying an organic outer layer.

22. In a paint, coating, printing ink, toner, plastic material, cosmetic formulation, food material, pharmaceutical product, ceramic material, glass, paper, security material, dry preparation, pigment preparation or tracer comprising conventional excipients and a pigment, the improvement wherein the pigment is one or more effect pigments according to claim 1.

* * * * *

UNITED STATES PATENT AND TRADEMARK OFFICE
CERTIFICATE OF CORRECTION

PATENT NO.         : 7,396,401 B2
APPLICATION NO.    : 10/894238
DATED              : July 8, 2008
INVENTOR(S)        : Michael Jungnitz It is certified that error appears in the above-identified patent and that said Letters Patent is hereby corrected as shown below:

Column 13, line 11, reads "n=the" should read -- n = the --
Column 13, line 12, reads "n>3," should read -- n > 3, --
Column 13, line 17, reads "n=3," should read -- n = 3, --
Column 14, line 2, reads "drying anchor calcining" should read -- drying and/or calcining --

Signed and Sealed this

Twenty-fourth Day of March, 2009

JOHN DOLL
*Acting Director of the United States Patent and Trademark Office*

(12) EX PARTE REEXAMINATION CERTIFICATE (8460th)
United States Patent
Jungnitz et al.

(10) Number: US 7,396,401 C1
(45) Certificate Issued: Aug. 9, 2011

(54) EFFECT PIGMENTS OF UNIFORM SHAPE AND SIZE

(75) Inventors: Michael Jungnitz, Langen (DE); Gerald Fuchs-Pohl, Weiterstadt (DE); Reinhold Rueger, Rödermark (DE)

(73) Assignee: Merck Patent GmbH, Darmstadt (DE)

Reexamination Request:
No. 90/010,503, Apr. 23, 2009

Reexamination Certificate for:
Patent No.: 7,396,401
Issued: Jul. 8, 2008
Appl. No.: 10/894,238
Filed: Jul. 20, 2004

Certificate of Correction issued Mar. 24, 2009.

(51) Int. Cl.
*C09C 1/00* (2006.01)
*B32B 5/16* (2006.01)
*B32B 9/00* (2006.01)
*B32B 15/02* (2006.01)
*B32B 17/02* (2006.01)
*B05D 3/02* (2006.01)
*B05D 1/36* (2006.01)
*B05D 7/00* (2006.01)

(52) U.S. Cl. .................................................. 106/415
(58) Field of Classification Search ................ None
See application file for complete search history.

(56) References Cited

U.S. PATENT DOCUMENTS

| 4,965,131 A | 10/1990 | Nair et al. | 428/407 |
| 5,702,519 A | 12/1997 | Nitta et al. | 106/442 |
| 5,814,367 A | 9/1998 | Hubbard et al. | 427/162 |
| 6,025,094 A | 2/2000 | Visco et al. | 429/231.95 |
| 6,630,018 B2 | 10/2003 | Bauer et al. | 106/415 |
| 6,902,807 B1 | 6/2005 | Argoitia et al. | 428/403 |

*Primary Examiner*—Elizabeth McKane

(57) ABSTRACT

Effect pigments based on a flake-form substrate that have a circular or elliptical shape or have the shape of a polygon, the preparation thereof, and the use thereof, for example, in paints or coatings, or as tracers.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 16 and 19 are cancelled.

Claims 1, 4, 7, 11-13, 15, 18 and 20 are determined to be patentable as amended.

Claims 5, 6, 8-10, 14, 17, 21 and 22, dependent on an amended claim, are determined to be patentable.

New claims 23, 24 and 25 are added and determined to be patentable.

1. An effect pigment of uniform shape and size based on a flake-form, inorganic substrate, comprising inorganic flake-form substrates which are uniform in shape and size and have a circular or elliptical shape[or a polygon $V_n$ shape, where
n=the number of corners and
n>3], wherein the flake-form inorganic substrate comprises [one or more metal oxides,] *silicon oxide, boron oxide, titanium oxide or zirconium oxide,* and on the substrate one or more layers comprising a metal oxide, metal oxide hydrates, metal suboxides, metal, metal fluorides, metal nitrides, metal oxynitrides or mixtures thereof.

4. The effect pigment according to claim 1, wherein the flake-form substrate has a circular or elliptical shape with a circle diameter or an ellipse main axis of 3 to 150 μm[, or has a polygon $V_n$ shape with a greatest diameter of 3 to 150 μm].

7. [The] *An* effect pigment[s according to claim 1,] *of uniform shape and size based on a flake-form, inorganic substrate, comprising inorganic flake-form substrates which are uniform in shape and size and have a circular or elliptical shape,*
  *wherein the flake-form inorganic substrate comprises one or more metal oxides, and on the substrate one or more layers comprising a metal oxide, metal oxide hydrates, metal suboxides, metal, metal fluorides, metal nitrides, metal oxynitrides or mixtures thereof obtained by a process comprising*
  a) applying a film comprising a substrate precursor to a structured support having structuring in circular or elliptical shapes [or in the shape of a polygon $V_n$],
  b) solidifying the film by drying,
  c) developing a substrate by chemical reaction from the substrate precursor,
  d) removing the substrate from the structured support, and
  e) optionally washing, drying and/or calcining the substrate, *and further comprising coating the substrate with one or more layers comprising a metal oxide, metal oxide hydrate, metal suboxide, metal, metal fluoride, metal nitride, metal oxynitride or a mixture thereof.*

11. [The] *An* effect [pigments according to claim 1,] *pigment of uniform shape and size based on a flake-form, inorganic substrate, comprising inorganic flake-form substrates which are uniform in shape and size and have a circular or elliptical shape,*
  *wherein the flake-form inorganic substrate comprises one or more metal oxides, and on the substrate one or more layers comprising a metal oxide, metal oxide hydrates, metal suboxides, metal, metal fluorides, metal nitrides, metal oxynitrides or mixtures thereof obtained by a process comprising*
  a) applying a film comprising a substrate precursor to a structured support having a structuring in circular or elliptical shape [or in the shape of a polygon $V_n$],
  b) optionally solidifying the film by drying,
  c) repeating a) and b) one or more times, in each consecutive case using a different substrate precursor,
  d) solidifying the film by drying,
  e) developing a substrate by chemical reaction from the substrate precursors,
  f) separating the substrate from the structured support, and
  g) optionally washing, drying [anchor] *and/or* calcining the substrate, *and further comprising coating the substrate with one or more layers comprising a metal oxide, metal oxide hydrate, metal suboxide, metal, metal fluoride, metal nitride, metal oxynitride or a mixture thereof.*

12. A process for preparing effect pigments according to claim 1, comprising:
  a) applying a film comprising a substrate precursor to a structured support having a structuring in circular or elliptical shape [or in the shape of a polygon $V_n$],
  b) optionally solidifying the film by drying,
  c) repeating steps a) and b) one or more times, in each consecutive case using a different substrate precursor,
  d) solidifying the film by drying,
  e) developing a substrate by chemical reaction from the substrate precursors,
  f) separating the substrate from the structured support, and
  g) optionally washing, drying and/or calcining the substrate, *and further comprising coating the substrate with one or more layers comprising a metal oxide, metal oxide hydrate, metal suboxide, metal, metal fluoride, metal nitride, metal oxynitride or a mixture thereof.*

13. A process for preparing effect pigments according to claim 1, comprising:
  a) applying a film comprising a substrate precursor to a structured support having structuring in circular or elliptical shapes [or in the shape of a polygon $V_n$],
  b) solidifying the film by drying, c) developing a substrate by chemical reaction from the substrate precursor, d) removing the substrate from the structured support, and
  e) optionally washing, drying and/or calcining the substrate, *and further comprising coating the substrate with one or more layers comprising a metal oxide, metal oxide hydrate, metal suboxide, metal, metal fluoride, metal nitride, metal oxynitride or a mixture thereof.*

15. A process according to claim 13, wherein the structuring has a circular or elliptical shape with a circle diameter or an ellipse main axis of 3 to 150 μm[, or has a polygon $V_n$ shape with a greatest diameter of 3 to 150 μm].

18. A process [according to claim 13,] *for preparing effect pigments according to claim 1, comprising:* a) *applying a film comprising a substrate precursor to a structured support having structuring in circular or elliptical shapes,* b) *solidifying the film by drying, c) developing a substrate by chemical reaction from the substrate precursor, d) removing the substrate from the structured support, and e) optionally washing, drying and/or calcining the substrate, and further comprising coating the substrate with one or more layers comprising a metal oxide, metal oxide hydrate, metal suboxide, metal, metal fluoride, metal nitride, metal oxynitride or a mixture thereof,* wherein the substrate precursor comprises a network former in the form of a soluble salt.

20. A process according to claim [19] *13*, wherein the coating with one or more layers is carried out wet-chemically, by a sol-gel process or by CVD or PVD process.

23. *In a paint, coating, printing ink, toner, plastic material, cosmetic formulation, food material, pharmaceutical product, ceramic material, glass, paper, security material, dry preparation, pigment preparation or tracer comprising conventional excipients and a pigment, the improvement wherein the pigment is one or more effect pigments according to claim 7.*

24. *In a paint, coating, printing ink, toner, plastic material, cosmetic formulation, food material, pharmaceutical product, ceramic material, glass, paper, security material, dry preparation, pigment preparation or tracer comprising conventional excipients and a pigment, the improvement wherein the pigment is one or more effect pigments according to claim 11.*

25. *An effect pigment of uniform shape and size based on a flake-form, inorganic substrate, consisting of inorganic flake-form substrates which are uniform in shape and size and have a circular or elliptical shape,*

*wherein the flake-form inorganic substrate consists of silicon oxide, boron oxide, titanium oxide or zirconium oxide, and on the substrate one or more layers consisting of metal suboxides, metal, metal fluorides, metal nitrides, metal oxynitrides or mixtures thereof.*

\* \* \* \* \*